US007650228B2

(12) United States Patent
Krikelis

(10) Patent No.: US 7,650,228 B2
(45) Date of Patent: Jan. 19, 2010

(54) INTERNET BASED HIGHWAY TRAFFIC ADVISORY SYSTEM

(75) Inventor: Peter C. Krikelis, Wilmington, DE (US)

(73) Assignee: ASTI Transportation Systems, Inc., Wilmington, DE (US)

( * ) Notice: Subject to any disclaimer, the term of this patent is extended or adjusted under 35 U.S.C. 154(b) by 364 days.

(21) Appl. No.: 11/342,064

(22) Filed: Jan. 26, 2006

(65) Prior Publication Data

US 2006/0167617 A1 Jul. 27, 2006
US 2007/0061065 A2 Mar. 15, 2007

Related U.S. Application Data

(60) Provisional application No. 60/647,511, filed on Jan. 27, 2005.

(51) Int. Cl.
*G06F 7/76* (2006.01)
*G08G 1/07* (2006.01)

(52) U.S. Cl. ........................ 701/117; 340/909; 340/910

(58) Field of Classification Search ................. 701/117, 701/118, 119; 340/906, 907, 908, 910
See application file for complete search history.

(56) References Cited

U.S. PATENT DOCUMENTS

| | | | | |
|---|---|---|---|---|
| 5,231,393 | A | 7/1993 | Strickland | |
| 6,204,778 | B1 * | 3/2001 | Bergan et al. | 340/936 |
| 6,353,792 | B1 * | 3/2002 | Murthy | 701/117 |
| 6,577,642 | B1 * | 6/2003 | Fijolek et al. | 370/465 |
| 6,798,356 | B2 * | 9/2004 | Flick | 340/989 |
| 2002/0027879 | A1 * | 3/2002 | Kuriki et al. | 370/229 |
| 2002/0116107 | A1 * | 8/2002 | Mahoney et al. | 701/50 |
| 2003/0233580 | A1 * | 12/2003 | Keeler et al. | 713/201 |
| 2006/0017562 | A1 * | 1/2006 | Bachelder | 340/531 |

* cited by examiner

*Primary Examiner*—Mark Hellner
*Assistant Examiner*—Helal A Algahaim
(74) *Attorney, Agent, or Firm*—RatnerPrestia

(57) ABSTRACT

A real time traffic control system that includes a plurality of roadside sensors and variable message displays arrayed along the highway connected to the Internet, and communicating with a central computer using the Internet. Each roadside device includes a modem and has a unique internet address. The central computer is programmed to create on demand a plurality of individual virtual communication ports, each of the ports corresponding to each of the unique device addresses, whereby said computer communicates in a quasi-simultaneous manner with all of the roadside devices.

13 Claims, 4 Drawing Sheets

INTERNET BASED HIGHWAY TRAFFIC ADVISORY SYSTEM

CROSS REFERENCE TO RELATED APPLICATIONS.

This application claims the benefit of priority to U.S. Provisional Application No. 60/647,511 filed on Jan. 27, 2005, the contents of which are incorporated herein by reference in their entirety.

FIELD OF THE INVENTION

This invention relates to a centrally controlled highway traffic advisory system and associated method and more particularly to a system and associated method for simultaneously addressing a plurality of remote sensors and displays from a remote location via the Internet.

BACKGROUND OF THE INVENTION

Highway construction zones and accidents are often a major source of congestion in highways as they interrupt the normal traffic flow due to temporarily restricting the available highway lanes. Reduction of the number of available traffic lanes and re-routing the traffic to improvised new traffic lanes cause conditions that are unexpected by the motorist.

To alleviate such congestion systems have been developed that advise the motorist well ahead of the construction or other incident zones of traffic problems ahead, and anticipated congestion and reduced speed requirements. Such systems may be either temporary, using free standing signaling devices such as remotely controllable traffic lights or variable message boards (VMS) in communication with a remote central controller together with movable roadside traffic flow sensors, or fixed using permanently installed variable message boards in combination with a remote controller and either permanent or temporary roadside traffic sensors. Roadside traffic flow sensors have been known to include occupancy detectors which detect vehicle flow interruption in a highway lane, traditional speed detectors and video cameras.

Typically such systems include a central control, usually located in the vicinity of the incident or construction zone but also possibly remote thereof. The central control is almost always a computer adapted to receive status information from different roadside devices and able to remotely control such devices so as to, in the case of a VMS for example, display messages to the motorists well ahead of the problem zone.

Communications between the central control and the roadside devices may be by hard wire connection, telephone link, or radio frequency transmitter/receiver (Transceiver). In such case, the roadside device and the central control include modems for communicating with each other.

"Advanced Portable Traffic Management System Work Zone Operational Test" by Nookala et al describes a highway safety system that incorporates the use of widespread spectrum radio, cellular phone and Integrated Services Digital Network (ISDN) phone links. The spread spectrum radio is used to link roadside nodes to the central control computer. The signal transfers from node to node, the nodes acting both as relay and a means of communication between nodes. Together with the ISDN link and cellular phone the system performs as part of an Ethernet network. Each remote terminal (roadside) is equipped with an Ethernet EHUB which allows multiple devices to share the Ethernet. The system includes establishment of a web page to provide traffic information accessible by motorists planning a trip through the Internet.

Thus there presently are known a number of sophisticated systems used in traffic control. However what these systems have in common is the sequential polling of the different roadside devices regardless of the communication mode adopted in the system. A much more efficient mode of communication would be the quasi-simultaneous polling of all devices particularly if such polling could be implemented in a continuous mode.

SUMMARY OF THE INVENTION

There is, therefore, provided in accordance with the present invention a method for obtaining real time traffic related information on a highway location by:

i. Providing a plurality of roadside devices comprising at least one traffic sensor along the highway for detecting traffic flow past a desired highway location and connecting the roadside devices to the Internet using a modem.

ii. Providing a central control computer also connected to the Internet via a modem, wherein the central control computer is programmed to provide a plurality of active virtual ports connected to the Internet through the modem.

iii. Obtaining a device Internet address for the central control computer and for each of the plurality of roadside devices and assigning a virtual port in the central control computer to each of the devices address.

iv. Establishing an Internet connection between each of the roadside devices and the central control computer whereby the central control computer accesses each of said roadside devices through the assigned virtual port.

The connection of the roadside devices to the Internet is preferably done using digital cellular modems, and, in at least one embodiment of this invention, variable message boards along the highway are used to communicate messages to passing motorists. The variable message boards are also connected to the central control computer using an Internet connection.

Still in accordance with the present invention, the plurality of roadside devices comprises a plurality of roadside traffic detectors and at least one variable message board, each of said roadside traffic sensors having a unique Internet address and each of said at least one variable message board also having a unique Internet address; the central control computer communicates with each of said roadside devices using a plurality of software generated unique virtual ports.

There is further contemplated according to this invention, a real time traffic control system comprising a plurality of roadside sensors arrayed along the highway each having a unique Internet address and each connected to the Internet. The system further comprises a central control computer also having a unique Internet address and connected to the Internet. The control computer is programmed to create on demand a plurality of individual virtual communication ports, each corresponding to one of the unique device addresses, whereby the computer communicates in a quasi-simultaneous manner with the roadside devices. Digital cellular modems are used to connect the roadside devices to the Internet.

DETAILED DESCRIPTION OF THE INVENTION

The invention will next be described with reference to the figures wherein same numerals are used to identify same elements in all figures. The figures illustrate the invention and are not intended to act as engineering or construction drawings, therefore they are not to scale and do not include all elements that may be included in such drawings, as inclusion of such elements would unduly clutter the drawings.

Figure 1:
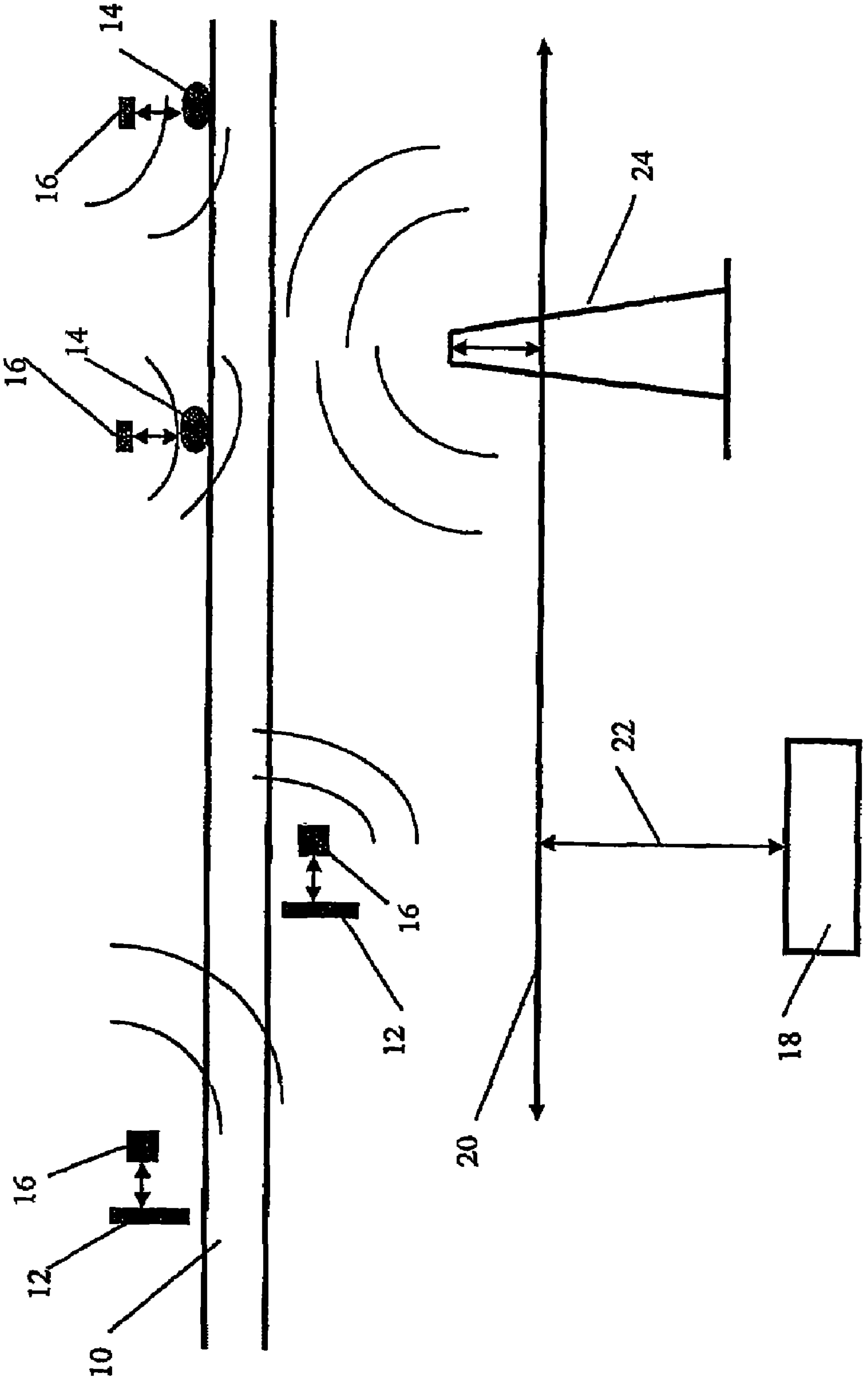
FIG. 1 is a schematic figure representing a system according to this invention implemented along a highway.

Referring next to FIG. 1 there is shown a highway 10 on which there have been deployed a plurality of means 12 to communicate a message to passing motorists. Such means typically comprise roadside display devices such as variable message boards, which, by way of illustration rather than limitation, may be either portable devices of the type disclosed in U.S. Pat. No. 5,231,393 issued to Strickland et al. in 1993 or fixed, or combinations of the two. Such roadside display devices typically provide for a plurality of messages to be displayed to passing motorists, and the message displayed may be pre-programmed actuated upon receipt of a pre-arranged code signal or composed and transmitted to the device from a remote location. However the message communication means may also comprise traffic signals (including traffic metering devices and conventional traffic lights), highway advisory radio or any other means that will notify a motorist of potential traffic issues ahead. We will refer to all such display devices from hereon as VMS.

Also deployed along the highway there is shown a plurality of roadside traffic detection sensors 14. Roadside sensors 14, by way of illustration rather than limitation may be speed sensors, occupancy sensors, sensors that determine the type of traffic passing through a designated zone, i.e. long (trucks) or short (passenger) vehicles, video cameras and/or combinations thereof. The roadside sensors may operate using infrared radiation, radar or any other convenient detection system.

Collectively we will refer to roadside displays/VMS and sensors as roadside devices.

Associated with each of the roadside devices, is a modem 16 such as a broadband data modem. Modem 16 may be a Code Division Multiple Access (CDMA), a Global System for Mobile computing (GSM) or an equivalent thereof. Each of the modems 16 provides a connection, preferably a high speed connection, between the roadside device and a global information network (e.g., the Internet) through a digital cellular data phone line, e.g., via the nearest cellular phone tower 24. As used herein, the term "Internet" refers to all such networks including, by way of illustration rather than limitation, the Internet, Internet2, and other such networks. Each of the roadside devices has an individual Internet address (herein "address"), preferably an Internet protocol (IP) address, that identifies the location of the device over the Internet.

A centrally located controller 18, i.e. a computer, usually located in a secure and convenient place unrelated to the zone or zones where the roadside devices are deployed, is also connected to the Internet. Such connection is most likely but not exclusively, a hard wired connection to a high speed Internet access provider. Obviously the controller can be located anywhere where Internet access is possible which in practical terms means almost anywhere in the world.

The central control computer is programmed to poll the roadside devices and obtain therefrom traffic information or send thereto instructions. For example the central control device may poll the traffic sensors and obtain data relating to real time local traffic flow. The central control computer may then send to the VMS's a command to display a message advising motorists of traffic conditions ahead.

The central control computer may be further programmed to provide certain commands and display messages automatically to the VMS's, such messages depending on the traffic information obtained from the traffic sensors, or the central control may display the information to an operator and the operator may in turn select the appropriate message to be communicated to the motorists on the highway. It is still within the scope of the present invention to provide a remote control computer connected to the central control computer and able to communicate with the central control computer via the Internet thereby to provide access to the central control computer from a remote location.

Alternatively, the central control computer does not have to be in a fixed location, but can be any properly programmed computer in a location with access to the Internet.

Figure 2:
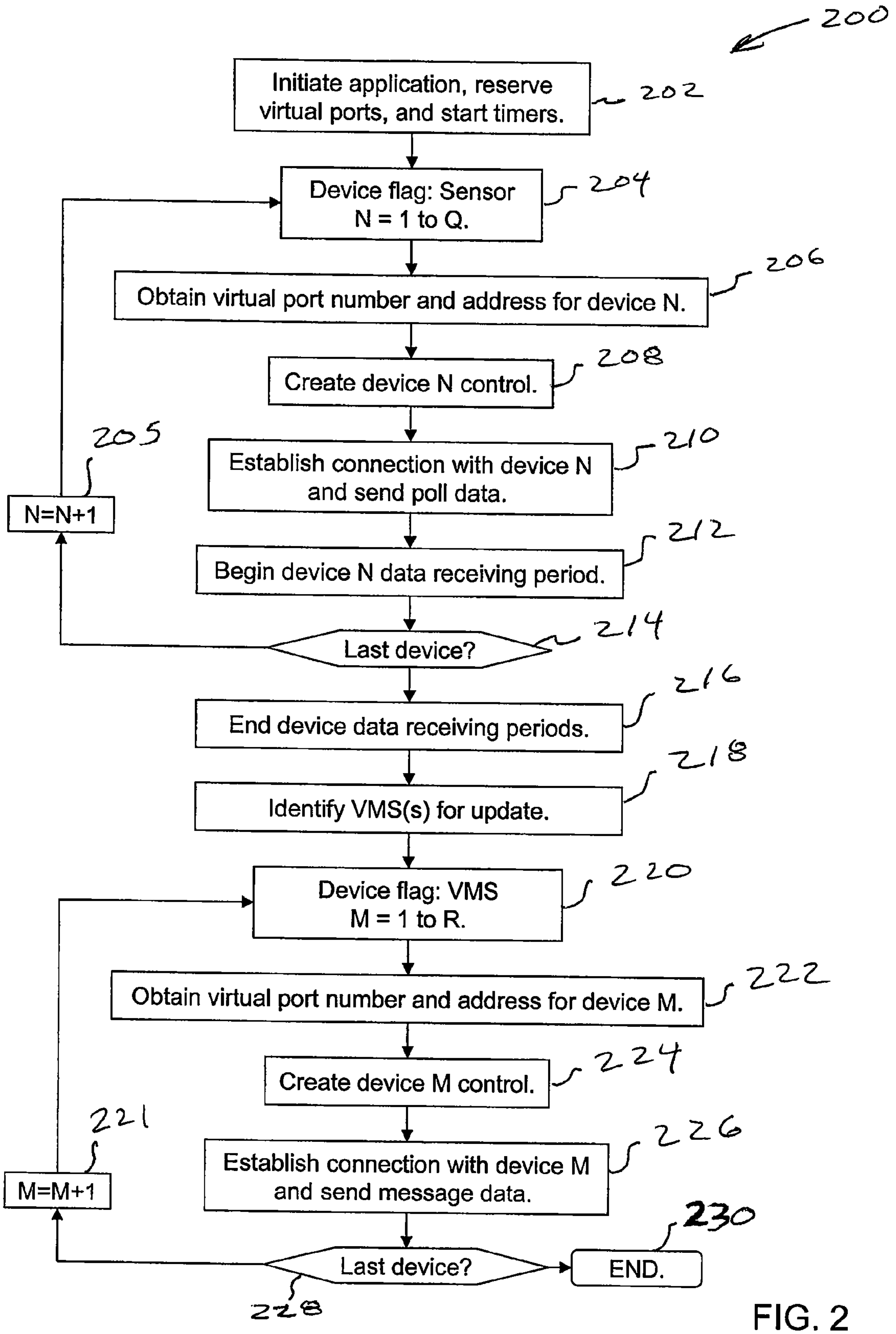
FIG. 2 is a flow diagram of exemplary steps for poling sensors and updating message boards in accordance to various aspects of the present invention.

FIG. 2 depicts a flow chart 200 of exemplary steps for polling sensors and displaying messages on VMS's in accordance with one embodiment of the present invention. At block 202, a polling/message display application (herein the "application") is initiated, virtual ports are reserved, and timers are starter. In an exemplary embodiment, the application resides on the central control computer and may be initiated by a user in a conventional manner. Upon initiation, the application reserves virtual ports within the central control computer and starts timers that control polling of the sensors and display of messages on the VMS's. A virtual port may be reserved for each unique one of the sensors and the VMS's for communications between the central computer and the sensors and VMS's. For example, if there are four (4) sensors and three (3) VMS's, the application may reserve seven (7) virtual ports for communication with these devices. In an exemplary embodiment, an identifier for each device and an associated virtual port are stored in a table. In addition, the address for each device may be stored in the table.

At block 204, the application sets a sensor device flag and indicates the number of sensors (Q) to be polled by the central control computer. The application then enters a loop, blocks 206-214, for sequentially establishing communication with the individual sensors. A counter 205 increments a sensor value N after each pass through the loop. The loop starts with establishing communication with a first sensor (N=1) and ends after establishing communication with a last sensor (N=Q).

The following is sample coding loop from the application for polling roadside sensors such as for example a queue detector:

```
For intLoopCounter = 1 to TOTALQ
        MDIForm 1.udpPeerQ(intLoopCounter).SendData(strToSend)
        MDIForm 1.StatusBar1.Panels(1) = "Sending-> "
           &.Fields("RadioAddress") & Chr(&HFF) &
           Chr(&H8F) & Chr(&H1) &
           Chr(&H2) & Chr(&H2)
     MDIForm 1. StatusBar1.Panels(2) =""
  Next intLoopCounter.
```

At block 206, a virtual port number and an address for the sensor are obtained. The virtual port number and the address for the current sensor may be obtained from the table discussed above with reference to block 202.

At block 208, a control for the sensor is created at the central control computer. Parameters such as port number, address, and polling string are passed to the control for defining communications between the central control computer and the sensor. In an exemplary embodiment, the control is a Windows Socket (Winsock) control. The Winsock control may be created through a subroutine that is called with the statement "MDIForm 1.udpPeerQ (intLoopCounter) .SendData(strToSend)" in the above sample coding loop.

At block 210, the central control computer establishes a connection with the sensor and sends polling data to the sensor through the established connection. In an exemplary embodiment, the connection is in accordance with a User Datagram Protocol (UDP). In accordance with this embodiment, the polling data may be sent by a SendData method associated with a SocketWrapper object that pushes a datagram which traverses the Internet as one packet that takes one path to the sensor or as multiple packets that follow multiple paths to the sensor. In alternative exemplary embodiments, the connections may be in accordance with TCP/IP or other such communication protocol. As a practical matter, the central control computer may be connected to the Internet and communications from the central control computer may travel from the central computer over the Internet to a transmitter (cellular tower) where it is transmitted to a modem associated with the device to which communications are being sent.

At block 212, a data receiving period begins for receiving responses to the polling data from the sensor, e.g., through the Winsock control for that sensor.

At block 214, the application checks if the sensor is the last sensor (e.g., N=Q). If the sensor is the last sensor (e.g., N=Q), processing proceeds at block 216. Otherwise, if the sensor is not the last sensor (e.g., N<Q), processing proceeds at block 204 with the steps of blocks 204-214 repeated for the next sensor.

At block 216, the receiving period for the sensors, which began at block 212, ends. In an exemplary embodiment, data from a sensor may be received at essentially anytime after poll data is sent to that sensor and ends sometime after the last sensor is polled. Thus, there is an overlap period during the receiving period in which data from multiple sensors may be received by the central control device. After the receiving period ends, the control created at block 208 may be terminated.

In the exemplary embodiment, the virtual ports established within the central control computer enable the central control computer to receive packet of data from multiple sensors in any sensor order and in any packet order. For example, data may be received from a first sensor 1 followed by data from a third sensor followed by data from a second sensor. In another example, a first packet may be received from a first sensor followed by a first packet from a second sensor followed by a second packet from the first sensor. In another example, a second packet from a first sensor may be received before the first packet of the first sensor is received. Thus, communications from the sensors may be received in a quasi-simultaneous manner.

Timers may be implemented to handle non-responsive sensors, e.g., for identifying a sensor for maintenance if the sensor has not responded for a particular period of time or number of cycles. In an exemplary embodiment, when a sensor responds a time/stamp is placed on the data and written to a database. This time stamp is checked every minute (with another timer, not shown) and compared to the current time. If the device has not responded for a predetermined period of time, the application generates an alarm. This alarm can be a visual alarm, an audible alarm, an e-mail being sent etc.

Figure 3:
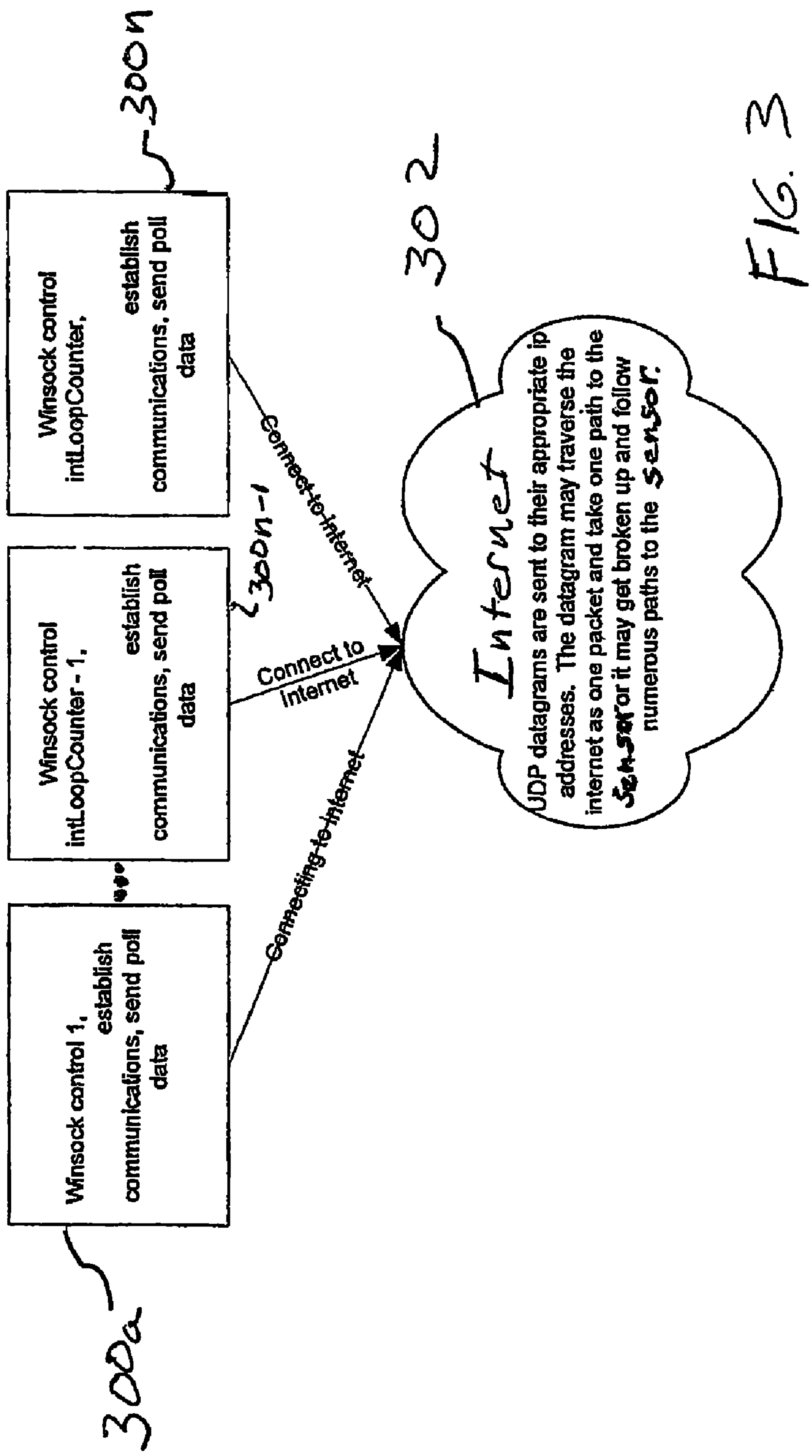
FIG. 3 is a schematic diagram showing the establishment of communication with sensors and the outflow of information in accordance with an aspect of the present invention.

FIG. 3 illustrates conceptually the steps performed in blocks 208 and 210. Blocks 300*a*-*n* represent the controls that were created in the central control computer in block 208. The controls 300*a*-*n* establish communication with associated sensors and send poll data to those sensors (block 210 ). Communication between the controls 300*a*-300*n* are established via the Internet 302. As illustrated in FIG. 3, multiple controls 300*a*-*n* may exist concurrently (e.g., as multiple threads) for communication with the sensors. Similar steps may be performed for communicating with VMS's.

Figure 4:
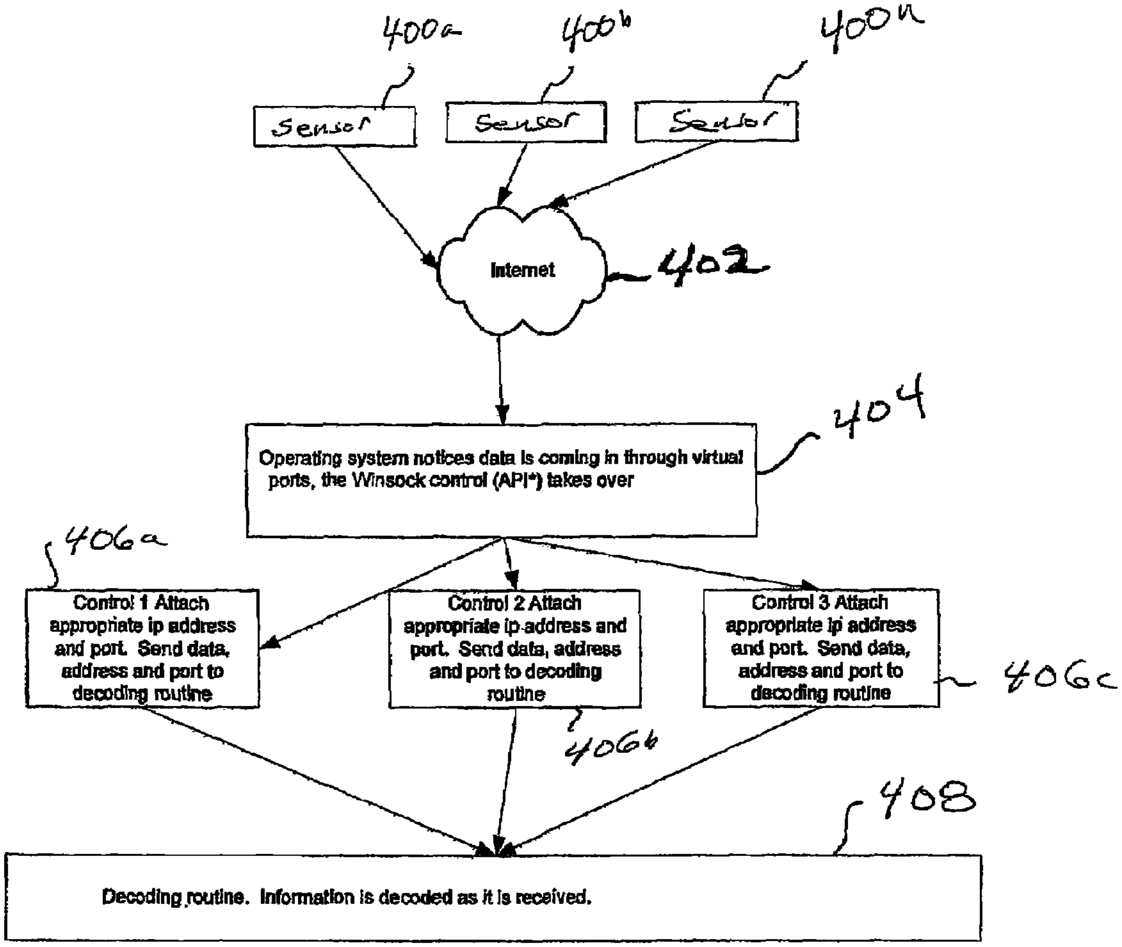
FIG. 4 is a schematic diagram showing the inflow and handling of information from sensors received in the central computer in accordance with aspects of the present invention.

FIG. 4 is a flow diagram illustrating the receipt of data from the sensors during the data receiving period that begins at block 212 (FIG. 2) and ends at block 216. As illustrated in FIG. 4, communications may be received from multiple sensors 400*a*-*n* concurrently (quasi-simultaneously), e.g., over the Internet 402. As stated above, each created control (e.g., Winsock control) is associated with a virtual port. When a sensor checks in, it checks in through its virtual port. The control for that virtual port then takes over at block 404, e.g., through a set of application programming interface routines (API) called by the application to request and carry out lower-level services performed by the computer's operating system. The individual controls (represented by controls 406*a*-*c*) process data received at their virtual port (e.g., using the API) by attaching the address of the sensor and their virtual port number to the data and passing the data, address, and virtual port number to a decoding routine 408. The decoding routine 408 decodes the received data—taking into account the address and virtual port information—to obtain polling results. This enables decoding of the data regardless of the order in which it is received. A similar process may be performed to receive information from the VMS's. Once the received information is decoded appropriate action may be taken such as developing messages and identifying VMS's to display those messages.

Referring back to FIG. 1, at block 218, one or more VMS's are identified for updating based on the results received from the sensors in response to the polling data. For example, if twenty sensors provide responses to the polling data and, based on those responses, there are four VMS's to be updated, those four VMS's are identified for updating. As one example, the information may indicate that traffic is stopped as detected by sensors "A" and "B" located at mile 25 of the highway. Once this information is displayed to an operator the operator may set a single VMS located along the highway a number of miles upstream of the stopped traffic to display a message advising the motorists of the situation and possibly suggesting alternate routes. In accordance with this example, this VMS would be identified as the sole VMS for update.

The central computer may also be programmed to send certain pre-recorded messages to selected VMS's depending on the status indication of roadside sensors such as speed or queue detectors. For example, receipt and decoding by the central control computer of a message indicating speed of traffic as less than a preset limit could trigger an automatic response in the form of a command sent to a VMS setting an appropriate preselected speed limit or a caution indication. Such messages may constantly change as the data received by the roadside traffic sensors provide new information regarding traffic flow, or may change at predetermined desired intervals.

At block 220, the application sets a VMS device flag and indicates the number of VMS's (R) that will be sent message data by the central control computer. The application then enters a loop, blocks 220-228, for sequentially establishing communication with the individual VMS's and sending messages thereto. A counter 221 increments a VMS value M after each pass through the loop. The loop starts with establishing communication with a first message board (M=1) and ends after establishing communication with a last message board (M=R). The message data may be sent using a coding loop similar to the sample coding loop described above.

At block 222, a virtual port number and an address for the VMS are obtained. The virtual port number and the address for the VMS may be obtained from the table discussed above with reference to block 202.

At block 224, a control for the VMS is created at the central control computer. Parameters such as port number, address, and a message board string are passed to the control for defining communications between the central control computer and the VMS. As described above, the control may be a Windows Socket (Winsock) control.

At block 226, the central control computer establishes a connection with the VMS and sends message data to the message board through the established connection. As described above, the connection may be a UDP, TCP/IP, or other such connection. The message data may include a textual message for display on the VMS or an indicator that instructs the VMS to display a prerecorded textual message. In addition, such as in the case of a traffic metering device VMS, the message data may include timing information for controlling STOP/GO lights on the traffic metering device or an indicator that instructs the traffic metering device to control lights based on predefined timing information.

At block 228, the application checks if the VMS is the last VMS (e.g., M=R). If the VMS is the last VMS (e.g., M=R), processing ends at block 230 (or proceeds at block 204 in a continuous loop until the application ends). Otherwise, if the VMS is not the last VMS (e.g., M<R), processing proceeds at block 220 with the steps of blocks 204-214 repeated for the next VMS.

In an exemplary embodiment, the VMS's may be polled to verify that the VMS's are displaying the correct information. In accordance with this embodiment, the VMS's may be polled using a routine similar to the routine for polling the sensors described above with reference to blocks 204-216. All VMS's may be polled to identify the messages currently being displayed for comparison with expected messages stored by the central control computer. Alternatively, only those VMS's that were updated most recently may be polled.

When information (e.g., a datagram) is sent over the Internet from the control computer to the device modems, the datagram may be broken into smaller packets and sent to the end device, or the whole datagram may go as one piece. If broken up, it is reassembled once it gets there. This applies for traffic traveling from the computer to the devices and from the devices to the computer. The operating system software on the computer puts the packets back together if they are broken apart, and the connecting device modem puts the packets together once they all reach it. Thus, information going to or coming from more than one device arrives at or leaves from the computer in a quasi-simultaneous manner when using more than one port.

Because data transmitted through the Internet is split into distinct smaller individual packets arriving at their destination along various separate routes, because the system does require confirmation of linking with a device or of successful transmission of the datagram, and through the use of the virtual ports, the central control computer is able to poll different roadside devices without waiting for the complete transmission/reception to and from each of the roadside devices. This process is referred to herein as "quasi-simultaneous" as distinguished from a process where the computer sequentially polls each device, that is, sends out a message and waits for the completion of the transaction prior to addressing another roadside device.

This applies for traffic traveling from the central control computer to the roadside devices and from the roadside devices to the central control computer. The central control computer operating system puts the packets back together if they are broken apart and the modem attached to the roadside device will put the packets together once they all reach it.

The central control computer and the roadside devices are preferably but not necessarily on what is referred to a permanently on status. This means that the link between the central control and the roadside devices is always "on" and there is constant communication between the central control computer and all of the devices quasi-simultaneously, thereby providing real time traffic information. Because the central control computer is always connected to all the devices it is able to receive information continuously from all the devices.

The foregoing system and process have been described with reference to a Microsoft operating system and routines and subroutines available through such system. While at present this is a preferred operating system, the present invention is not to be limited to use with this operating system exclusively. Rather this one example of the present invention which is readily implemented at this time. However other operating systems and subroutines may be used to create the multiplicity of virtual ports used in accordance with the present invention to communicate with a plurality of devices in a quasi-simultaneous fashion through an Internet connection.

What is claimed:

1. A method for obtaining real time traffic related information on a highway location using a plurality of roadside devices said roadside devices comprising traffic sensors, the method comprising:

i. providing a plurality of roadside devices comprising at least one traffic sensor along said highway for detecting traffic flow past said highway location and connecting said roadside devices to the Internet;

ii. providing a central control computer also connected to the Internet via a modem, wherein said central control computer is programmed to provide a plurality of active virtual ports connected to the Internet through said modem, iii. obtaining a device Internet address for said central control computer and for each of said plurality of roadside devices and assigning a virtual port in said central control computer to each of said devices address;

iv. establishing an Internet connection between each of said at least one roadside device and said central control computer whereby said central control computer accesses said each of said roadside devices through said assigned virtual port by polling said each of said roadside devices to obtain traffic information; and v. receiving at said central control computer, responsive to said polling, said traffic information from said plurality of roadside devices in non-sequential order, wherein said traffic information from each of said plurality of roadside devices is received quasi-simultaneously via said assigned virtual ports.

2. The method according to claim 1 wherein the step of connecting said plurality of roadside devices to the Internet is performed using digital cellular modems.

3. The method according to claim 1 wherein said plurality of roadside devices further comprises means to communicate a message to a passing motorist.

4. The method according to claim 3 wherein said message communicating means comprises a variable message board (VMS) also connected to the Internet.

5. The method according to claim 4 wherein said Internet connection is performed using a digital cellular modem.

6. The method according to claim 1 wherein said plurality of roadside devices comprises a plurality of roadside traffic sensors and at least one variable message board, each of said roadside traffic sensors having a unique Internet address and each of said at least one variable message board also having a unique Internet address and wherein the central control computer communicates with each of said roadside devices using a plurality of software generated unique virtual ports, and wherein said communication occurs quasi-simultaneously via said plurality of software generated unique virtual ports.

7. The method according to claim 6 wherein said central computer is connected to the Internet using an Ethernet port.

8. The method according to claim 6 wherein said Internet address is an IP address.

9. The method according to claim 6 wherein said Internet address is a URL address.

10. A method for communicating with a plurality of roadside display devices positioned along a highway, the method comprising:

i. providing a plurality of roadside display devices along the highway for displaying messages to passing motorists and connecting the plurality of roadside display devices to the Internet;

ii. providing a central control computer also connected to the Internet, wherein the central control computer is programmed to provide a plurality of active virtual ports connected to the Internet, iii. obtaining a device Internet address for each of the plurality of roadside display devices and assigning at least one of the plurality of active virtual ports in the central control computer to the device Internet address of each roadside display device;

iv. establishing an Internet connection between each of the plurality of roadside display devices and the central control computer whereby the central control computer accesses each of the roadside display devices through the assigned virtual port; and v. polling with the central computer the roadside display devices in a quasi-simultaneous manner in order to verify information displayed by the plurality of roadside display devices.

11. The method according to claim 10, wherein the step of connecting the plurality of roadside display devices to the Internet is performed using digital cellular modems.

12. The method according to claim 10, wherein each of the roadside display devices have a unique Internet address and wherein the central control computer communicates with each of the roadside display devices using a plurality of software generated unique virtual ports, and wherein the communication occurs quasi-simultaneously via said plurality of software generated unique virtual ports.

13. The method according to claim 12, wherein the Internet address is an Internet protocol (IP) address or a uniform resource locator (URL) address.

* * * * *